April 5, 1932. A. S. ISAKSEN 1,852,305
JACK
Filed Oct. 4, 1930
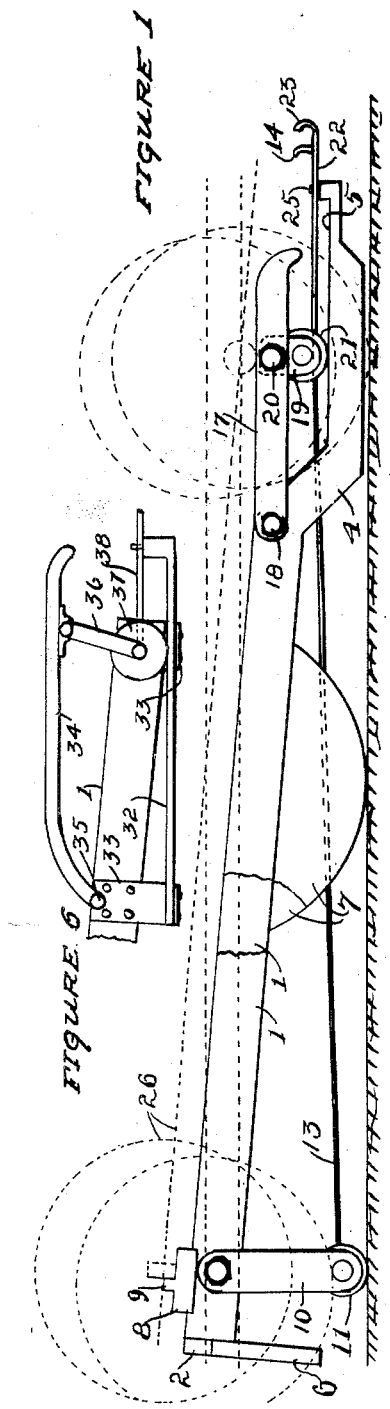
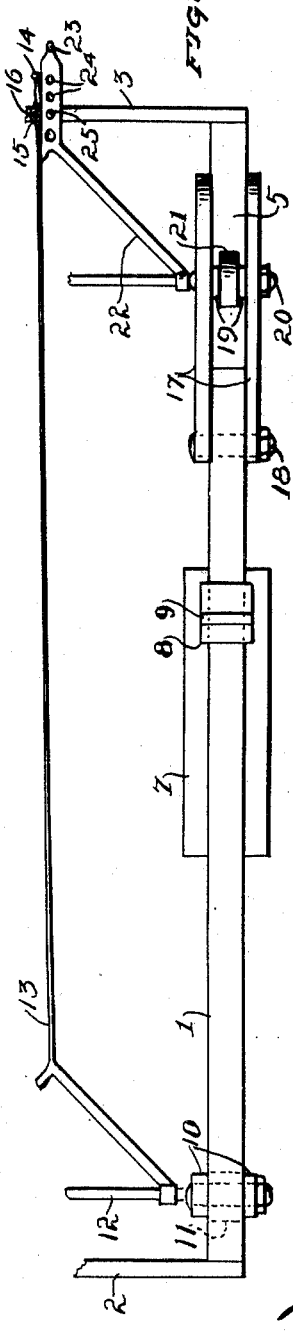
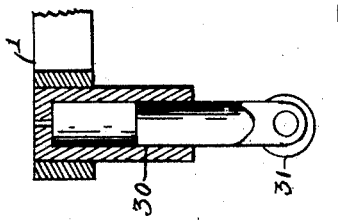
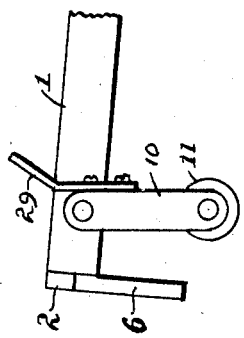
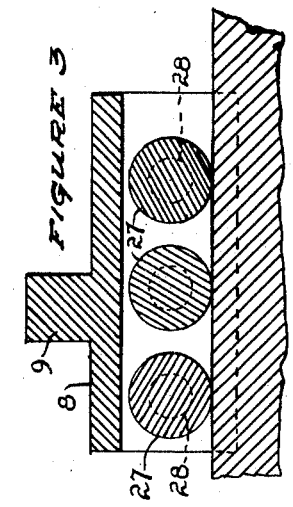
INVENTOR
Anders S. Isaksen
John A. Naismith
ATTORNEY Patented Apr. 5, 1932

1,852,305

UNITED STATES PATENT OFFICE

ANDERS S. ISAKSEN, OF SAN JOSE, CALIFORNIA

JACK

Application filed October 4, 1930. Serial No. 486,405.

This invention relates particularly to an automobile jack.

It is one object of the invention to provide a jack so constructed and operated as to be capable of lifting an automobile bodily and support the same with its weight entirely removed from the wheels, whereby to prolong the life of the tires.

It is also an object of the invention to provide a jack of the character indicated that will be operated by the weight of the automobile, thereby eliminating the necessity of providing screw lifts and other mechanical elevating devices.

It is still another object of the invention to provide a device of the character indicated that will be economical to manufacture, simple in form and construction, of few parts, strong, durable, and highly efficient in its practical application.

In the drawings:

Figure 1 is a side elevation of a jack embodying my invention.

Figure 2 is a plan view of the same, part being broken away.

Figure 3 is an enlarged sectional view of one of the traveller shoes.

Figure 4 is a side elevation of a portion of the device showing another embodiment of the invention.

Figure 5 is a sectional detail illustration of another form of supporting leg.

Figure 6 is a side elevation of another form of track support and rear leg mounting.

In the embodiment of the invention as herein disclosed, I show at 1—1 a pair of side bars spaced by end cross bars 2 and 3. The rear ends of these bars are formed as shown at 4 to form tracks as 5, and upon the front end are mounted legs as indicated at 6. The frame so formed is mounted upon centrally disposed rockers as shown at 7.

Mounted to operate upon the upper edge of each side bar is a sliding shoe 8 provided with an upstanding lug 9.

Adjacent the forward end of each bar is pivotally mounted a leg 10 having a roller as 11 mounted on its lower end. These legs are connected by a rod 12 to which is attached an operating rod 13 fitted with a handle 14 and provided with a hole at 15 adapted to engage a peg 16 on cross bar 3.

On the rear end of each bar 1 are pivotally mounted arms as 17 on bolts 18, the arms 17 having leg members 19 pivotally mounted thereon as at 20 and carrying rollers as 21 adapted to ride on tracks 5. The legs 19 are connected by a bar or rod 22 provided with a handle 23 and having holes 24 formed therein to engage a peg 25 on cross bar 3.

When the device is set ready for use it is adjusted as shown in Figure 1 with the sliding shoes 8 in the position shown in Figure 2. When an automobile is driven over the device to straddle the same the front axle engages the shoes 8 and upon which the forward end of the automobile rides until it assumes the position indicated generally by the dotted lines 26, the longitudinal axis of the automobile lying parallel with the frame 1 and the front wheels being elevated a distance from the ground. The automobile is moved to this position under its own power. By disengaging the rod 13 from peg 16 the legs 10 may now be swung out from under the frame 1, permitting the frame to rock forwardly on rockers 7 until its forward end rests upon legs 6 and consequently moves into a substantially horizontal plane. This movement is secured, of course, by so adjusting the several parts that the frame is over balanced at its forward end when the load is in position thereon. This movement operates to elevate the rear end of the automobile so that both its front and rear wheels are supported in spaced relation to the ground.

When it is desired to use the automobile it is only necessary to detach rod 22 from peg 25 and swing arms 19 about pivots 20, the wheels 19 rolling on track 5 and permitting the arms 17 to swing downwardly about pivots 18 and thereby lowering the rear wheels of the automobile to the ground, after which it may be backed off of the jack under its own power.

In Figure 3 is shown a shoe 8—9 fitted with rollers 27 journaled therein as at 28 and adapted to roll upon the upper edge of bar 1.

In Figure 4 it is shown that an arm 29 may be mounted upon the upper end of each forward leg 10 in the path of travel of the shoes 8 whereby to automatically swing the legs out from under the frame when the load reaches its final position thereon.

In Figure 5 is shown a dash-pot device mounted upon the forward end of frame 1 and fitted with roller 31, the device 30 permitting the forward end of the frame and its load to settle gradually to a horizontal position.

In Figure 6 a form of the invention is shown wherein the side bars 1 are straight and a track 32 is mounted on each one by supports 33, the arm 34 being pivotally mounted at 35. The leg 36 is fitted with roller 37 and is inclined somewhat from the vertical as shown. By this means when the rod 38 is detached from its peg the roller moves along track 32 and lowers the arm 34 and the load thereon without requiring any effort upon the part of the operator.

It may now be readily seen that I have provided a simple, strong, durable, and easily operated device for quickly and easily raising an automobile off of the ground when not in use and thereby greatly prolonging the useful life of the tires.

It is to be understood, of course, that while I have herein shown and described but a few embodiments of the invention, changes in form, construction, and method of assembly and operation may be made within the scope of the appended claims.

I claim:

1. An automobile jack comprising, a rocker frame, supports for one end thereof adapted to be moved into and out of an operative position and adapted to support the frame in an angular position relative to the ground, means for limiting the rocking movement of the frame when said supports are in an inoperative position, supporting tracks disposed upon the other end of the frame, arms pivotally mounted on the frame and disposed over the tracks, supporting means for the arms mounted on said tracks and adapted to be moved into and out of an operative position relative thereto, and means mounted on the frame and movable lengthwise thereof and adapted to engage and carry the front end of the automobile.

2. An automobile jack comprising, the combination of a rockable frame adapted to engage the under parts of an automobile and be actuated by the weight thereof to raise the same from the ground, and independently operable collapsible means inserted between the frame and the portion of the automobile thereon including the drive wheels whereby the drive wheels of the automobile may be lowered with respect to the frame to permit moving the automobile from the jack under its own power.

3. An automobile jack comprising, a rockable frame, collapsible means mounted on one end thereof for supporting the same in angular relation to a horizontal plane, means mounted on said end for supporting the frame in parallel relation to a horizontal plane, tracks mounted on the other end of the frame below the plane thereof, collapsible means mounted on the tracks and adapted to engage the under parts of an automobile, manually operable means for effecting the collapse of said last mentioned means, and means mounted on the frame and movable lengthwise thereof and adapted to engage and carry the front end of the automobile.

4. An automobile jack comprising, a frame, centrally disposed rocker supports therefor, legs pivotally mounted on the forward end of the frame, rollers mounted on the free ends of the legs, an operating rod connected to the legs and extending to the rear of the frame, a releasable fastening for the rod, fixed legs mounted on said forward end, said legs being shorter than the pivoted legs, tracks mounted on the other end of the frame below the plane thereof, arms pivotally mounted on the frame and extending rearwardly over the tracks, legs pivotally mounted on the arms, rollers mounted on the last named legs and engaging the tracks, an operating rod connected to the last named legs and extending to the rear of the frame, a releasable fastening for the rod, and shoes slidably mounted on the frame to move lengthwise thereof and adapted to engage and carry the front end of an automobile.

ANDERS S. ISAKSEN.